March 30, 1926.
R. B. McGOWAN
FUNNEL FOR TRANSFERRING LIQUIDS
Filed April 2, 1923
1,578,902
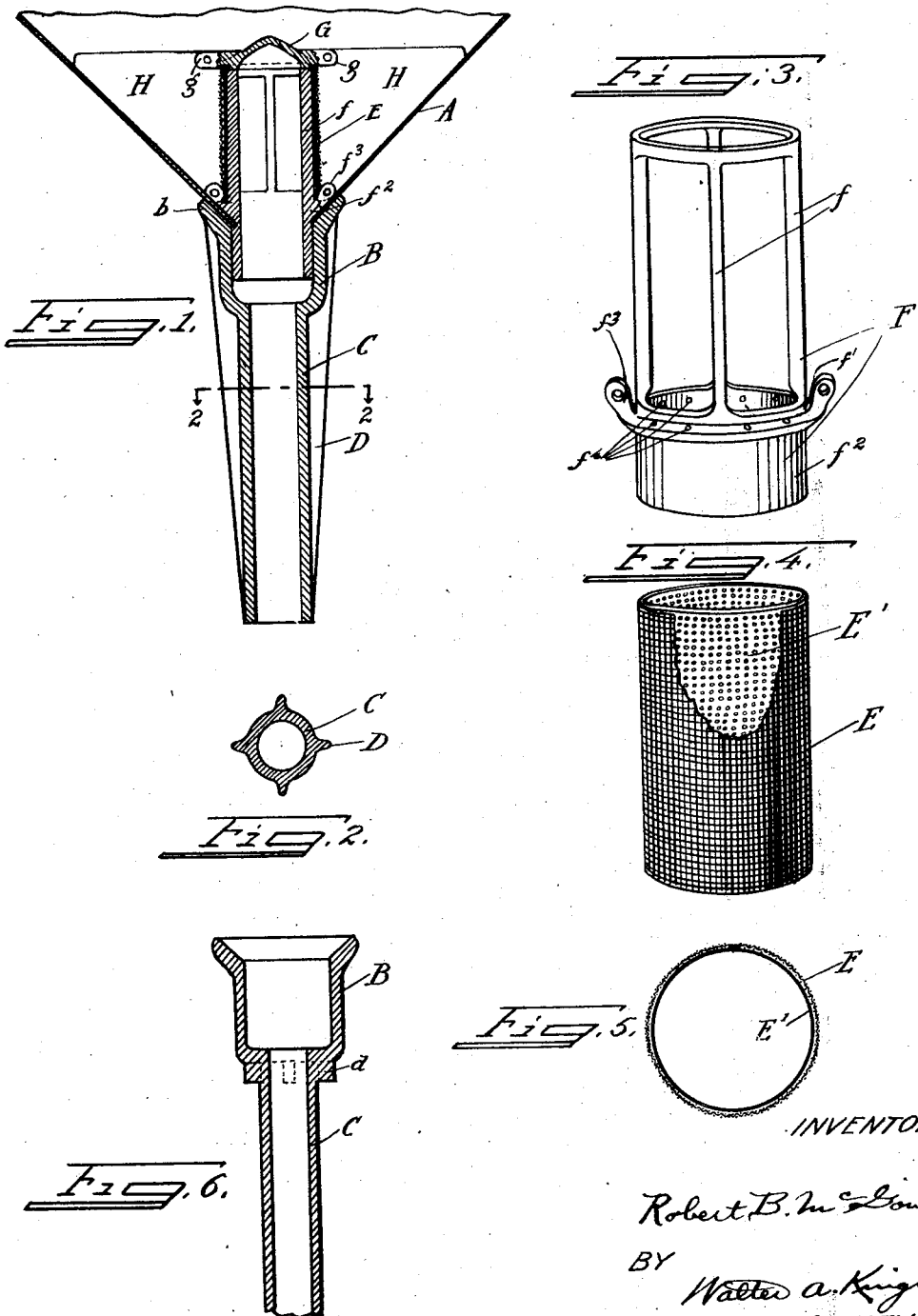
INVENTOR:
Robert B. McGowan
BY Walter A. Knight
ATTORNEY.

Patented Mar. 30, 1926.

1,578,902

UNITED STATES PATENT OFFICE.

ROBERT B. McGOWAN, OF CINCINNATI, OHIO, ASSIGNOR TO JOHN D. BERGER, OF CINCINNATI, OHIO.

FUNNEL FOR TRANSFERRING LIQUIDS.

Application filed April 2, 1923. Serial No. 629,268.

*To all whom it may concern:*

Be it known that I, ROBERT B. McGOWAN, a citizen of the United States, residing at Cincinnati, in the county of Hamilton and State of Ohio, have invented new and useful Improvements in Funnels for Transferring Liquids, of which the following is a specification.

My invention relates to funnels used in the transferring of liquids from one receptacle to another, and particularly to funnels embodying strainers.

The principal object of my invention is to construct a strong durable funnel provided with a strainer that can be readily attached thereto or detached therefrom as may be required in omitting, cleansing or renewing the strainer.

Another object of my invention is to construct a funnel provided with a strainer and means secured to said strainer to prevent the swirling in the funnel of the liquid to be strained.

Another object of my invention is to so construct and secure the strainer in the funnel as to protect the strainers from being damaged when the funnels are racked or nested.

A further object of my invention is to construct a funnel as above described, provided with means, to allow the escape of air from the receptacle into which the liquid is being strained.

In the accompanying drawings selected for illustration,

Fig. 1 is a vertical cross-section thru my improved funnel and strainer, showing a spout with tapered, ribbed air vents, Fig. 2 is a horizontal cross section taken on line 2—2 of Fig. 1, Fig. 3 is an elevation of my strainer, cage F, Fig. 4 is an elevation of my cylindrical strainer, part of the outer strainer member being broken away to show the inner strainer member, Fig. 5 is a plan view of my improved strainer member, and Fig. 6 is a vertical cross section thru the spout and base of my improved device when made with a radially ribbed base for venting.

Referring now to the drawings, particularly to Fig. 1, A is a funnel body secured by any suitable means to the flange $b$, forming part of the base B. The base B is preferably formed integral with the spout C which has a cylindrical opening. A plurality of ribs D are formed lengthwise of the spout and base B and C so as to allow the escape of air from the receptacle into which the liquid is to be poured.

A cylindrical strainer comprising an inner stiffening member $E^1$ surrounded by an outer member of fine gauze E, is adapted to fit snugly over the vertical bars $f$ of the cage F and rest on the flange $f^1$ integral with the cylindrical shank $f^2$ of said cage.

A cap G (see Fig. 1) provided with lugs $g$ forms a cover for the top of the strainer E, $E^1$, protects the strainer, and holds said strainer in place by means of the baffle plates H, H secured to the lugs $g$ of the cap G, and to corresponding lugs $f^3$ integral with the cylindrical base $f^2$ of the cage. Said cap G thereby diverts the flow of liquid to the outside of the strainer E.

The strainer members E and $E^1$ may be made either of tubular pieces of perforated metal or otherwise formed of foraminous material or from a single sheet of woven or otherwise suitably formed material, whose connecting edges are interlocked, so as to permit paint, varnish or the like to be burnt off the strainer; there being no solder to melt off.

The cylindrical shank $f^2$ of the cage F is constructed so as to fit snugly within the shank recess of the base B of the funnel, being held in position by frictional contact therewith, or otherwise. Oblique drainage holes $f^4$ are provided thru the flange $f^1$ to ensure complete drainage.

In the modified form of base shown in Fig. 6, I provide a spout with both interior and exterior walls cylindrical and instead of the longitudinal ribs D, I provide a plurality of ribs $d$, across the underside of the base B, to allow the escape of air from the receptacle into which the liquid is being poured.

The baffle plates H secured to the cage F are adapted to prevent a vortex from being formed within the funnel when the liquid is passing therethru.

I do not wish to be limited to the exact device as shown but conceive as within the scope of my invention numerous modifications which will be readable on the claims.

I claim as my invention and desire to se- cure by Letters Patent of the United States:—

1. In a funnel for transferring liquids, a cage carrying a strainer within said funnel body, and a plurality of baffle plates secured to said cage.

2. In a funnel for transferring liquids, a funnel body secured to a base and a spout attached to said base, a cage carrying a strainer within said funnel body, and baffle plates secured to said cage.

3. In a funnel for transferring liquids, a strainer supporting cage, a strainer around said cage, a cover for the top of said cage and strainer and baffle plates within said funnel, secured to said cover and said cage.

4. In combination with a funnel for transferring liquids comprising a funnel body secured to a hollow base and a spout attached to said base, a strainer supporting cage, a strainer around said cage, a cover for the top of said cage and strainer, and baffle plates within said funnel secured to said cover and said cage.

In testimony whereof I have hereunto set my hand.

ROBERT B. McGOWAN.